Aug. 28, 1923.
C. A. DE CEW ET AL
1,466,090
BAND SAW MACHINE
Filed May 7, 1921
2 Sheets-Sheet 1
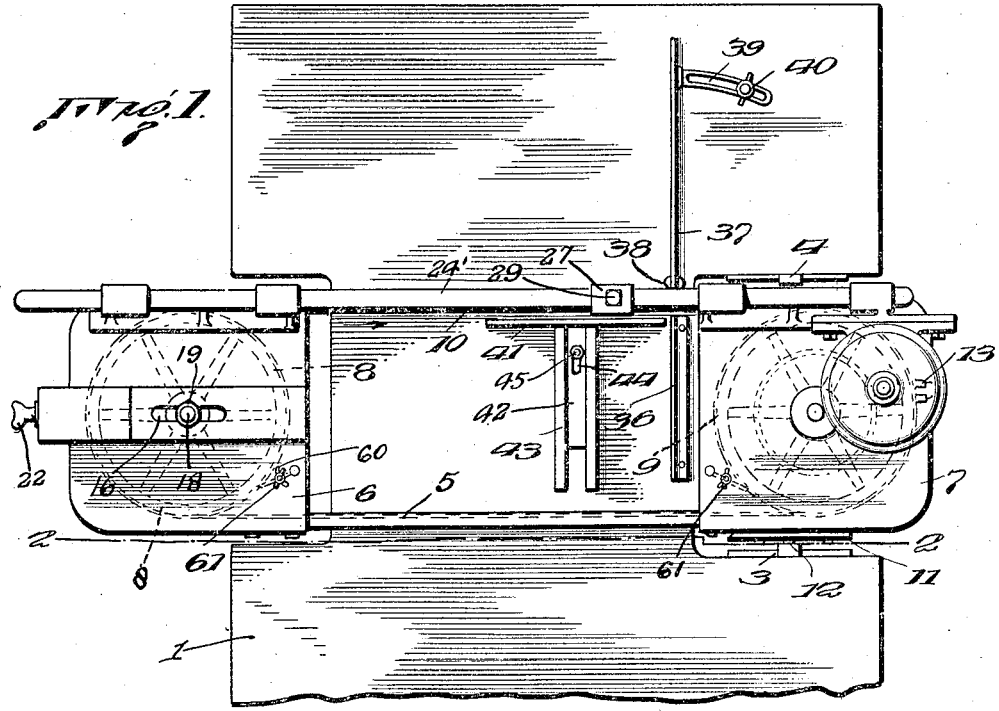
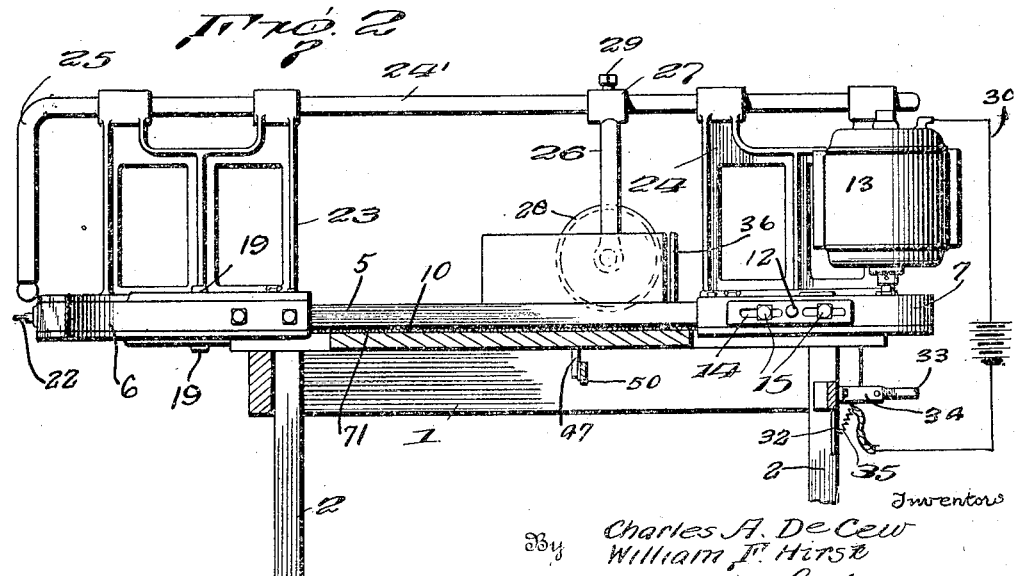
Inventors
Charles A. De Cew
William F. Hirst
By William C. Linton Attorney Aug. 28, 1923.
C. A. DE CEW ET AL
1,466,090
BAND SAW MACHINE
Filed May 7, 1921      2 Sheets-Sheet 2
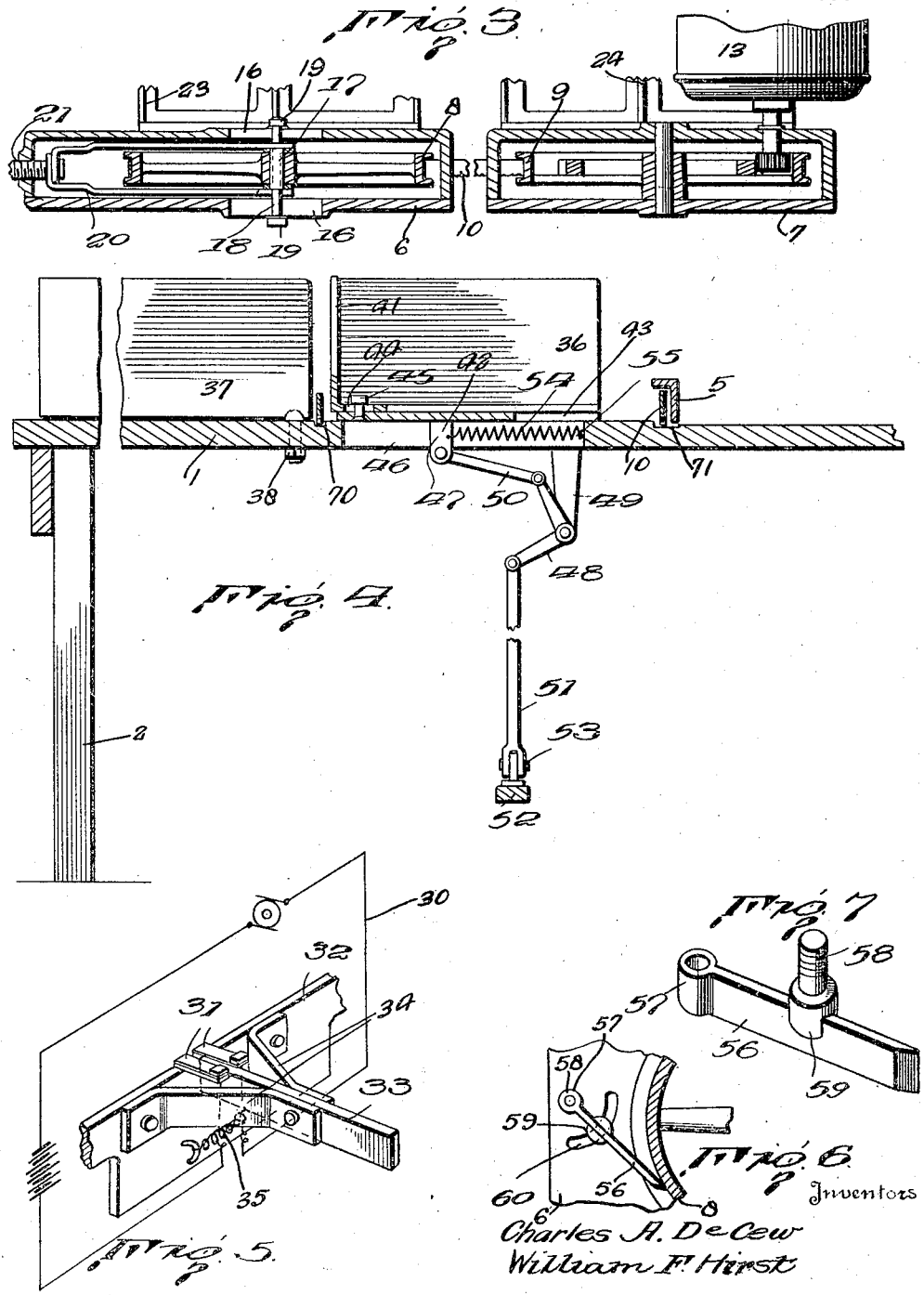
Inventors
Charles A. DeCew
William F. Hirst
By William C. Linton
Attorney Patented Aug. 28, 1923.

1,466,090

UNITED STATES PATENT OFFICE.

CHARLES A. DE CEW AND WILLIAM F. HIRST, OF CEDAR RAPIDS, IOWA.

BAND-SAW MACHINE.

Application filed May 7, 1921. Serial No. 467,761.

*To all whom it may concern:*

Be it known that CHARLES A. DE CEW and WILLIAM F. HIRST, citizens of the United States, and residing at Cedar Rapids, in the county of Linn and the State of Iowa, have invented certain new and useful Improvements in Band-Saw Machines; and they do hereby declare that the following is a full, clear, and exact description of the invention, such as will enable others skilled in the art to which it appertains to make and use the same.

This invention has reference to improvements in portable band saws, such as shown in our United States Patent Number 1,374,638, having for an object to provide a combined power operated band saw and table therefor capable of use for various purposes and being particularly applicable as a meat saw.

It is also an object of the invention to provide a meat saw of the character mentioned employing a novel form of frame, upon which the band saw and the motive means therefor are mounted in compact relationship and with such nicety of disposition or balance as to cause said frame to be swung upwardly to a substantially vertical position when the saw is not in use, thus permitting of easy and proper arrangement of the meat to be cut thereby on the table prior to engagement of the saw with the same.

Yet another object of the invention may be stated to reside in the provision of means for adjusting the meat to be cut on the table, so that the cut when made will be of a thickness corresponding to the sliced portion thereof.

A further object of the invention is to provide a motor operated band saw with an automatic electric control switch for the motive means thereof, such switch being operable upon the swinging of the band saw frame to a substantially horizontal position with respect to the table whereby to close an electric circuit through the motive means and thus energize the same in order that the desired rotary driving motion will be imparted to the band saw, such energization of the motive means being automatically discontinued with the releasing of the band saw frame and the swinging of the same to its normal or inoperative position.

Other objects will be in part obvious and in part pointed out hereinafter.

In order that the invention and its mode of application may be readily understood by persons skilled in the art, we have in the accompanying illustrative drawings and in the detailed following description based thereon, set out one practical embodiment of the same.

In these drawings:

Fig. 1 is a top plan view of the improved table and band saw;

Fig. 2 is a side elevation of the saw, while the table therefor is shown in section;

Fig. 3 is a fragmentary vertical longitudinal section through the saw showing the mounting of the same upon said frame;

Fig. 4 is a fragmentary transverse section through the table and the adjustable meat stop together with the means for actuating the latter;

Fig. 5 is a detail in perspective of the automatic electric control switch;

Fig. 6 is a detail in elevation of the band saw cleaner; and,

Fig. 7 is a detail in perspective of said cleaner.

Having more particular reference to the drawings, in connection with which like characters of reference will designate corresponding parts throughout the several views, 1 represents the table or other support for our improved band saw, said table being provided with the usual supporting legs 2, while the intermediate portion thereof is cut away transversally of itself and provided with, on the opposite sides of said cut away portion and in proximity to one side thereof, bearing brackets 3 and 4.

The frame for carrying the band saw comprises a longitudinally disposed connecting bar 5 which is rigidly engaged at its opposite ends with housings 6 and 7 carrying sheaves 8 and 9 therein, about which said band saw indicated by the numeral 10 is adapted to travel. The table top is provided with the grooves 70 and 71 through which pass the band saw 10 and the edge of the channel bar 5 which protects the returning portion of the band saw also rests within the grooves 71. Brackets 11 are secured to the opposite sides of the housing 7 and are provided with laterally extending pintles 12 which are engaged in the bearing brackets 3 and 4 heretofore described, whereby to provide a pivotal mounting for the saw frame. In this connection, it is to be noted that said brackets 11 are arranged in spaced relation to the outer end of the casing 7 in order that said outer portion may have a suitable form of counter balance arranged thereon whereby the opposite end of the band saw carrying frame will be normally maintained in a fully raised position, that is, the frame in its entirety, when not in use, will assume a substantially vertical position.

An electric motor 13 may be and preferably is employed as the motive means for the band saw and, as above intimated, this motor is arranged on that portion of the sheave housing 7 outwardly from its pivotal mounting in the bearing brackets 3 and 4, thus affording the desired counter balance for the saw frame. The rotary armature shaft of the motor 13 is extended downwardly through suitable bearings formed in the top of the housing 7 into the latter and is connected, through the medium of suitable gearings, with said sheave 9 in order that rotary motion may be imparted thereto for actuating the band saw 10.

In order that the pivotal mountings of the band saw frame with respect to the table 1 may be adjusted to secure the necessary balancing of the frame in order that it will be normally maintained in a substantially vertical position, we may and preferably do slot the bearing brackets 11 as indicated at 14 in the Figure 2, securing said brackets in their adjusted positions upon the adjacent portions of the casing 7 by means of locking screws 15 or other suitable fastening devices 15.

In order that the band saw 10 may be placed under sufficient tension to ensure its proper functioning, the sheave 8, arranged at what may be designated as the forward end of the band saw carrying frame, is preferably adjustably mounted in its respective housing 6, said housing as will be noted upon reference to the Figure 3, having longitudinal slots 16 formed in its top and bottom portion, while the sheave 8 receives a sleeve 17 therethrough and receiving therethrough in turn, a bolt 18 having locking nuts 19 engaged with its opposite screw threaded extremities and with the adjacent outer surfaces of said upper and bottom portion of the housing 6. In this way, slidable adjustment of the sheave 8 in its housing 6 will be permitted and to effect such adjustment the free ends of a sectional yoke 20 are engaged with the connecting bolt 18 and swivelly engaged at its rear end with an adjusting screw 21 which is mounted in the outer end of the casing 6 and provided with the usual wing handle 22 whereby rotation of the same will be facilitated. Obviously, as the screw 21 is rotated, it will impart a sliding adjusting movement to the sheave 8 causing the same to be shifted either backwardly or forwardly in its housing 6 and by consequence, either tightening or loosening the band saw 10 with respect thereto and the sheave 9.

In order to facilitate operation of the device, bearing pillars 23 and 24' are secured to the upper sides of the sheave housings 6 and 7 and receive therethrough the longitudinally disposed handle bar 24', the forward end of which bar is bent downwardly at substantially right angles as at 25 for an obvious purpose.

Adjustably secured to the intermediate portion of the handle bar 24 is a bracket arm 26 having a sleeve 27 formed on one end thereof, while on its remaining end a sheave 28 is rotatably mounted and is disposed for engagement with that side of the band saw engaging the meat to be cut in order that said portion of the saw will be maintained in its engagement with the material to be cut. A set screw 29 is turned into engagement with the sleeve 27 and obviously affords means for locking the arm 26 in its adjusted position upon the handle bar 24'. Furthermore, it is to be understood that the sheave 28 is comparatively thin in order that it may readily enter the cut made by the band saw 10 and follow the same during further operations thereof.

To automatically control energization of the motor 13, we provide a rubbing contact switch consisting of contact points 31 which are interposed in the motor circuit 30 and preferably, arranged on a strip 32 secured to the table legs 2 at a point in proximity to the pivotal mounting of the band saw frame. A circuit closing arm 33 is pivoted between converging arms 34 also secured to said strip 32 and carries contacts on its inner end adapted for engagement with the contact points 31; a contractile coiled spring 35 being connected at one end to the inner end of circuit closing arm 33 and at its other end to a portion of the strip 32 whereby said inner end of the arm 33 will be brought into engagement with the contact points 31. However, upon the raising of the band saw frame to its inoperative or substantially vertical position, the pivoted end portion of the housing 7 will engage the outer portion of the circuit closing arm 33 and will cause the same to be swung downwardly, thereby moving the inner end of the arm upwardly out of contact with the points 31 and in consequence, breaking the circuit through the motor 13.

Stops 36 and 37 are arranged on the table top transversally of the band saw carrying frame, as shown in the Figure 1, the stop 36 being adapted to be secured at a point adjacent to the inner end of the sheave housing 7, while the stop 37 is pivotally mounted on the table at 38 and carries a segmental slotted bracket 39 on its free end, which bracket is adapted to be engaged by a locking bolt 40 passed through a portion of the table into engagement with the segmental bracket 39. In this way, the stop 37 can be secured in different positions on the table in order to effect the proper positioning of the meat to be cut with respect to the band saw carrying frame. Also, an adjustable stop plate 41 is carried by a sliding arm or plate 42 arranged on the table and has a right angularly disposed arm 42 arranged on the table top and slidably engaged in parallel guides 43 secured to the table top and disposed longitudinally thereof as shown in the Figure 1, said arm 42 being formed with a longitudinal slot 44 which receives therein a locking bolt 45 adapted to permit adjustment between the plate 41 and the arm 42. A portion of the table 1 is cut away as at 46 and receives in said cut away portion, an ear 47 bent downwardly from the arm 42 whereby connection may be had with a bell crank lever 48 pivotedly mounted in a bracket 49 secured to the under side of the table 1 through the medium of a connecting link 50. To the free end of the bell crank lever 48, a connecting bar 51 is pivoted and extends downwardly into pivotal engagement with a foot pedal 52, as at 53. A contractile coiled spring 54 is preferably secured at one of its ends to said ear 47 and at its other to an adjacent portion of the table 1 as at 55, thus exerting a pull on the adjustable stop 41 whereby the same will be moved away from that side of the band saw 10 which engages the meat to be cut. However, by depressing the pedal 52, the bell crank lever 48 will be rocked in a direction to impart a push to the adjustable stop plate 41, and in consequence, said plate may be regulated with respect to the cutting portion of the band saw so as to limit the movement of the meat to be cut.

In order that the band saw 10 may be kept clean, a cleaning blade 56 having a bearing 57 formed on one end thereof is arranged in the sheave housing 6 and is adapted to have the free end thereof engaged in the groove in the sheave 8 during its rotary movement. A bolt 58 having a slotted head 59 is arranged in an arcuate slot 60 formed in the top of the housing 6 and has said slotted head 59 thereof engaged with the blade 56 as clearly shown in the Figure 7.

Thus, it will be understood that the blade 56 can be moved either to or from the peripheral portion of the sheave 8 as may be desired and to lock the blade in its adjusted position, a wing nut 61 is turned into engagement with the extended or free end of the bolt 58.

The operation of our improved combined band saw and table may be reviewed as follows:

The meat to be cut is arranged on the table 1 adjacent to the stop 37 and is so positioned with respect to the cutting portion of the band saw 10 that said portion will engage the bone or other part thereof to be cut at a point corresponding to the thickness of the slice. With the meat properly adjusted on the table, the upper or free end of the band saw carrying frame is grasped and pulled downwardly until it is disposed transversally of the table. With such downward movement of the band saw carrying frame, the outer end of the sheave casing 7 will disengage the outer portion of the circuit closing arm 33 and allow the inner portion of said arm to contact with the points 31 thus completing a circuit through the motor 13, which upon rotation will transmit a corresponding motion to the sheave 9 and by consequence, will cause operation of the band saw 10. That side of the band saw 10 opposite the guide 5 is now engaged with the portion of the meat to be cut and with completion of such cutting operation, the handle bar 24' with its downwardly bent portion 25 may be released, whereupon the band saw carrying frame will be caused to swing to its vertical or inoperative position, by reason of the counterbalancing of the frame through the medium of the motor 13. The outer portion of the sheave housing 7 will now engage the corresponding part of the circuit closing arm 33 and swing the inner part of said arm upwardly out of engagement with the contact points 31, thereby breaking the electrical circuit through the motor 13 and interrupting its rotation.

Manifestly, the construction shown is capable of considerable modification and such modification as is within the scope of our claims we consider within the spirit of our invention.

We claim:

1. A band saw machine including a table having a notch at one side, pivot sockets fixed to the confronting sides of the notch, a band saw frame having one end disposed opposite said notch, pivot plates mounted on the opposite sides of said end and adjustable longitudinally thereof and independently of each other, said pivot plates having pivots entering said sockets, and means to hold the pivot plates in adjusted positions.

2. A band saw machine including a table having a notch at one side, pivot sockets fixed to the confronting sides of the notch, a band saw frame having one end disposed opposite said notch, pivot plates mounted on the opposite sides of said end and adjustable longitudinally thereof and independently of each other, said pivot plates having pivots entering said sockets, means to hold the pivot plates in adjusted positions, a band saw extending longitudinally of said frame and a driving motor mounted on the outer part of the pivoted end of said frame.

In witness whereof we have hereunto set our hands.

CHARLES A. DE CEW.
WILLIAM F. HIRST.